(12) United States Patent
Cassia et al.

(10) Patent No.: US 12,353,759 B2
(45) Date of Patent: Jul. 8, 2025

(54) HETEROGENEOUS IN-STORAGE COMPUTATION

(71) Applicant: NETLIST, INC., Irvine, CA (US)

(72) Inventors: Ricardo Cassia, Rancho Santa Margarita, CA (US); Vladimir Alves, Tustin, CA (US)

(73) Assignee: NETLIST, INC., Irvine, CA (US)

( * ) Notice: Subject to any disclaimer, the term of this patent is extended or adjusted under 35 U.S.C. 154(b) by 0 days.

(21) Appl. No.: 17/559,999

(22) Filed: Dec. 22, 2021

(65) Prior Publication Data

US 2022/0113912 A1 Apr. 14, 2022

Related U.S. Application Data

(63) Continuation of application No. 16/897,196, filed on Jun. 9, 2020, now abandoned.

(60) Provisional application No. 62/859,674, filed on Jun. 10, 2019.

(51) Int. Cl.
*G06F 3/06* (2006.01)

(52) U.S. Cl.
CPC .......... *G06F 3/0659* (2013.01); *G06F 3/0614* (2013.01); *G06F 3/0629* (2013.01); *G06F 3/0656* (2013.01); *G06F 3/0679* (2013.01)

(58) Field of Classification Search
CPC ...... G06F 3/0659; G06F 3/0614; G06F 3/029; G06F 3/0656; G06F 3/0679
See application file for complete search history.

(56) References Cited

U.S. PATENT DOCUMENTS

| | | | |
|---|---|---|---|
| 8,386,759 B1* | 2/2013 | Duwel | G06F 9/4401 326/39 |
| 9,503,094 B1* | 11/2016 | Munday | G06F 9/44505 |
| 9,552,316 B2 | 1/2017 | Desimone et al. | |
| 9,619,164 B2 | 4/2017 | Mehta et al. | |
| 9,779,016 B1* | 10/2017 | Shen | G06F 1/28 |
| 10,067,844 B2 | 9/2018 | Lu | |
| 10,223,316 B2 | 3/2019 | Mataya | |
| 2009/0063895 A1 | 3/2009 | Smith | |
| 2010/0017650 A1* | 1/2010 | Chin | G06F 11/108 710/22 |
| 2012/0240012 A1 | 9/2012 | Weathers et al. | |
| 2014/0344647 A1 | 11/2014 | Chilappagari et al. | |
| 2014/0365699 A1 | 12/2014 | Barga | |
| 2015/0277512 A1 | 10/2015 | Davis et al. | |
| 2016/0154762 A1 | 6/2016 | He et al. | |

(Continued)

OTHER PUBLICATIONS

ONFI3.1 specification available online at https://onfi.org/files/onfi_3_1_spec.pdf (Year: 2012).*

(Continued)

*Primary Examiner* — Tim T Vo
*Assistant Examiner* — Janice M. Girouard
(74) *Attorney, Agent, or Firm* — Vorys, Sater, Seymour and Pease LLP; Khaled Shami (57) ABSTRACT

A storage device. In some embodiments the storage device includes a storage controller; a nonvolatile memory device connected to the storage controller through a first physical interface, and a processing circuit. The processing circuit may be connected, through a second physical interface, to the storage controller or to the nonvolatile memory device, the second physical interface being the same as the first physical interface.

17 Claims, 9 Drawing Sheets

(56) References Cited

U.S. PATENT DOCUMENTS

2018/0011812 A1\* 1/2018 Morishita ............... G06F 3/067
2018/0239799 A1\* 8/2018 Hosogi ................ G06F 16/951
2019/0108145 A1\* 4/2019 Raghava ............ G06F 13/1668
2020/0174881 A1 6/2020 Qin

OTHER PUBLICATIONS

A presentation titled "ONFI Standards and What They Mean to Designers" by Michael Abraham of Micron Technology, Inc., attached to this office action and available on the internet at https://files.futurememorystorage.com/proceedings/2008/20080813_T1B_Abraham.pdf (Year: 2008).\*

The Microsoft Computer Dictionary Fifth Edition describing computer terms, including p. 423 that contains a definition of processing. (Year: 2002).\*

"Stratix V Device Overview", Altera Corporation, Oct. 1, 2015, pp. 1-23.

U.S. Office Action from U.S. Appl. No. 15/195,912, dated Jun. 4, 2018, 13 pages.

\* cited by examiner

HETEROGENEOUS IN-STORAGE COMPUTATION

CROSS-REFERENCE TO RELATED APPLICATION(S)

The present application is a continuation of U.S. patent application Ser. No. 16/897,196, filed Jun. 9, 2020, entitled "HETEROGENEOUS IN-STORAGE COMPUTATION", which claims priority to and the benefit of U.S. Provisional Application No. 62/859,674 filed Jun. 10, 2019, entitled "HETEROGENEOUS IN-STORAGE COMPUTATION"; the entire contents of all of the documents identified in this paragraph are incorporated herein by reference.

The present application is related to U.S. Pat. No. 10,223,316, issued Mar. 5, 2019, which is incorporated herein by reference.

FIELD

One or more aspects of embodiments according to the present disclosure relate to persistent storage, and more particularly to a system and method for heterogeneous in-storage computation.

BACKGROUND

Related art computing systems employing hardware acceleration may include a host connected to a persistent storage device and to a hardware accelerator. In such a system, data to be processed by the hardware accelerator may flow through the host, burdening the host, and potentially resulting in a throughput bottleneck.

Thus, there is a need for an improved system and method for accelerated data processing.

SUMMARY

According to an embodiment of the present invention, there is provided a storage device, including: a storage controller; a nonvolatile memory device connected to the storage controller through a first physical interface; and a processing circuit connected, through a second physical interface, to the storage controller or to the nonvolatile memory device, the second physical interface being the same as the first physical interface.

In some embodiments, the nonvolatile memory device is configured to communicate with the storage controller utilizing a first protocol, and the processing circuit is configured to communicate with the storage controller utilizing the first protocol.

In some embodiments, the first protocol is Toggle or Open NAND Flash Interface (ONFI).

In some embodiments, the processing circuit is configured to support write commands sent to the processing circuit by the storage controller.

In some embodiments, the processing circuit is configured to support read commands sent to the processing circuit by the storage controller.

In some embodiments, the processing circuit includes a buffer for temporary data storage.

In some embodiments: the processing circuit is a programmable processing circuit, and the storage controller is configured to program the processing circuit.

In some embodiments, the processing circuit is a field programmable gate array.

In some embodiments: the storage controller is configured to write parameters to memory in the processing circuit; and the processing circuit is configured to process data based on the parameters.

In some embodiments, the storage controller is configured to: read data from the nonvolatile memory device, write the data to the processing circuit.

In some embodiments, the processing circuit is configured to read data directly from the nonvolatile memory device.

In some embodiments, the storage controller is configured to write, to the processing circuit, an address, in the nonvolatile memory device, of data to be processed.

In some embodiments, the processing circuit is further configured to: process the data, and write a result of the processing of the data directly to the nonvolatile memory device.

According to an embodiment of the present invention, there is provided a system, including: a host, including a host central processing unit (CPU), and a storage device, wherein the host is configured to: write, to the processing circuit, an address, in the nonvolatile memory device, of data to be processed.

In some embodiments: the host is configured to write parameters to memory in the processing circuit; and the processing circuit is configured to process data based on the parameters.

In some embodiments, the processing circuit is configured to read the data to be processed directly from the nonvolatile memory device.

In some embodiments, the processing circuit is further configured to: process the data, and write a result of the processing of the data directly to the nonvolatile memory device.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for heterogeneous in-storage computation provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
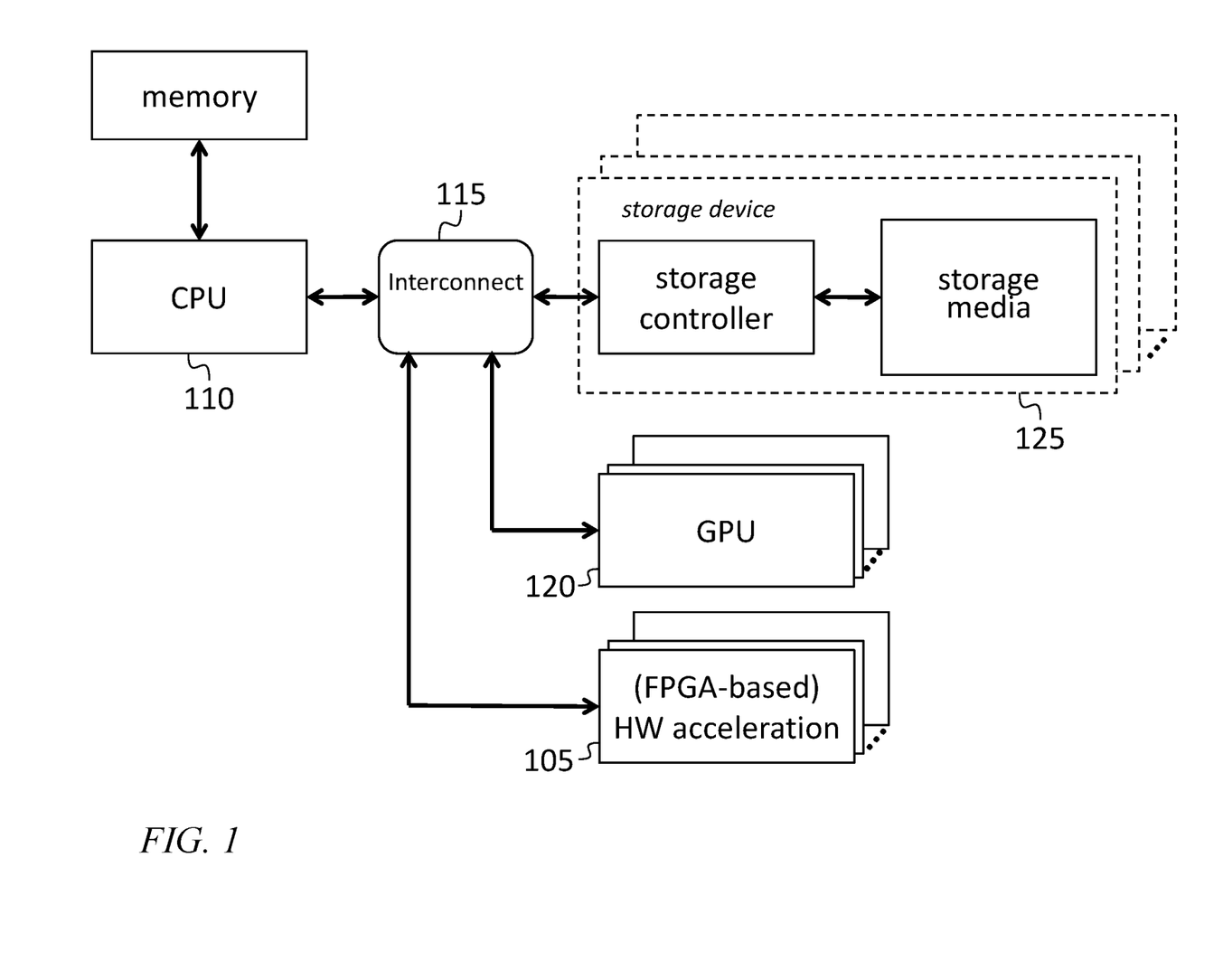
FIG. 1 is a block diagram of a system for storage and processing of data, according to an embodiment of the present disclosure.

Referring to FIG. 1, in some related art embodiments hardware acceleration is performed by a hardware accelerator 105 that may be connected to a host CPU 110 through an interconnect 115 (e.g., a switch (e.g., a PCIe switch)). Other computing resources (e.g., one or more GPUs 120) may also be connected to the host CPU 110, as well as one or more storage devices 125 (such as solid state drives (SSDs)).

Figure 2A:
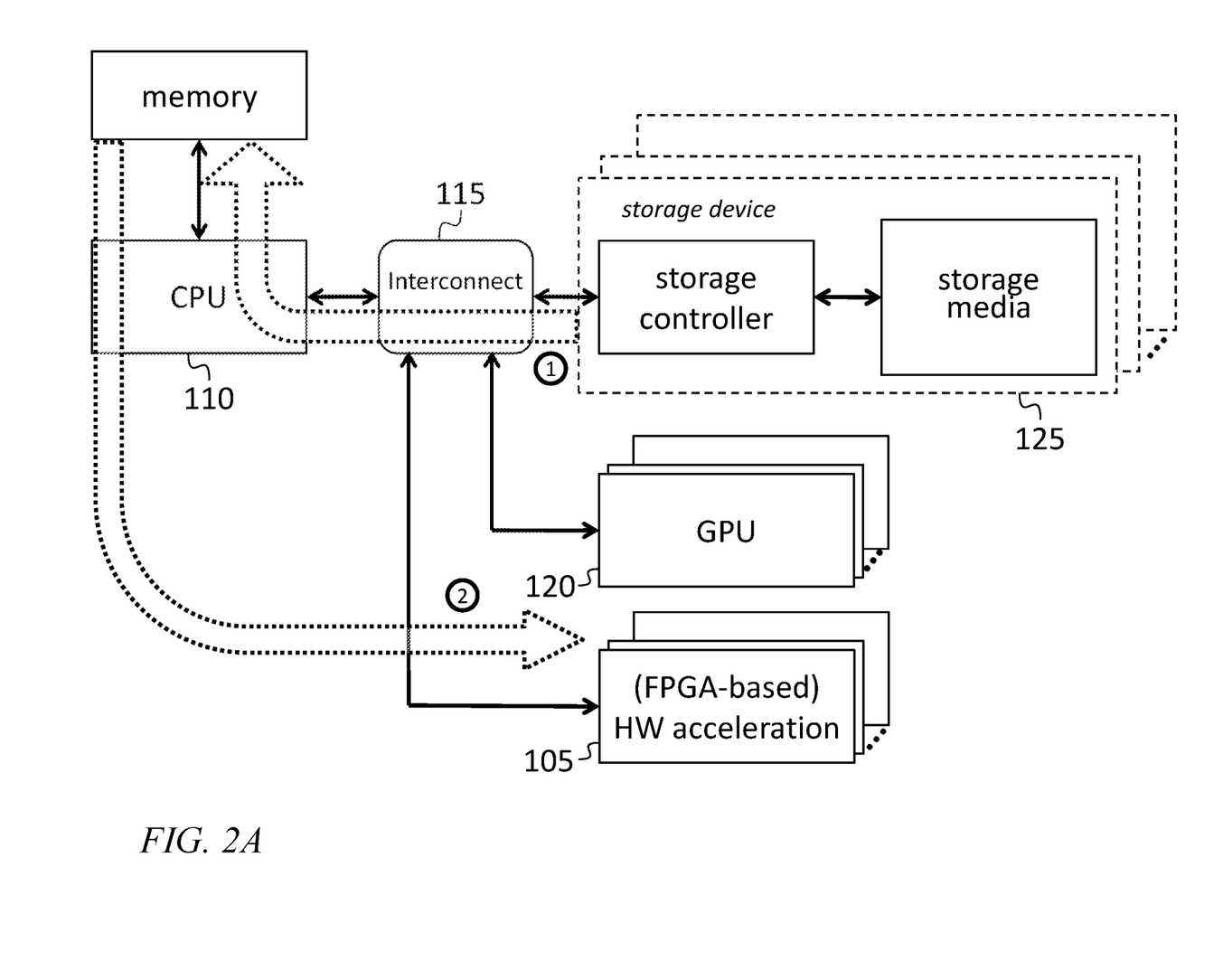
FIG. 2A is a block diagram of a system for storage and processing of data, according to an embodiment of the present disclosure.
Figure 2B:
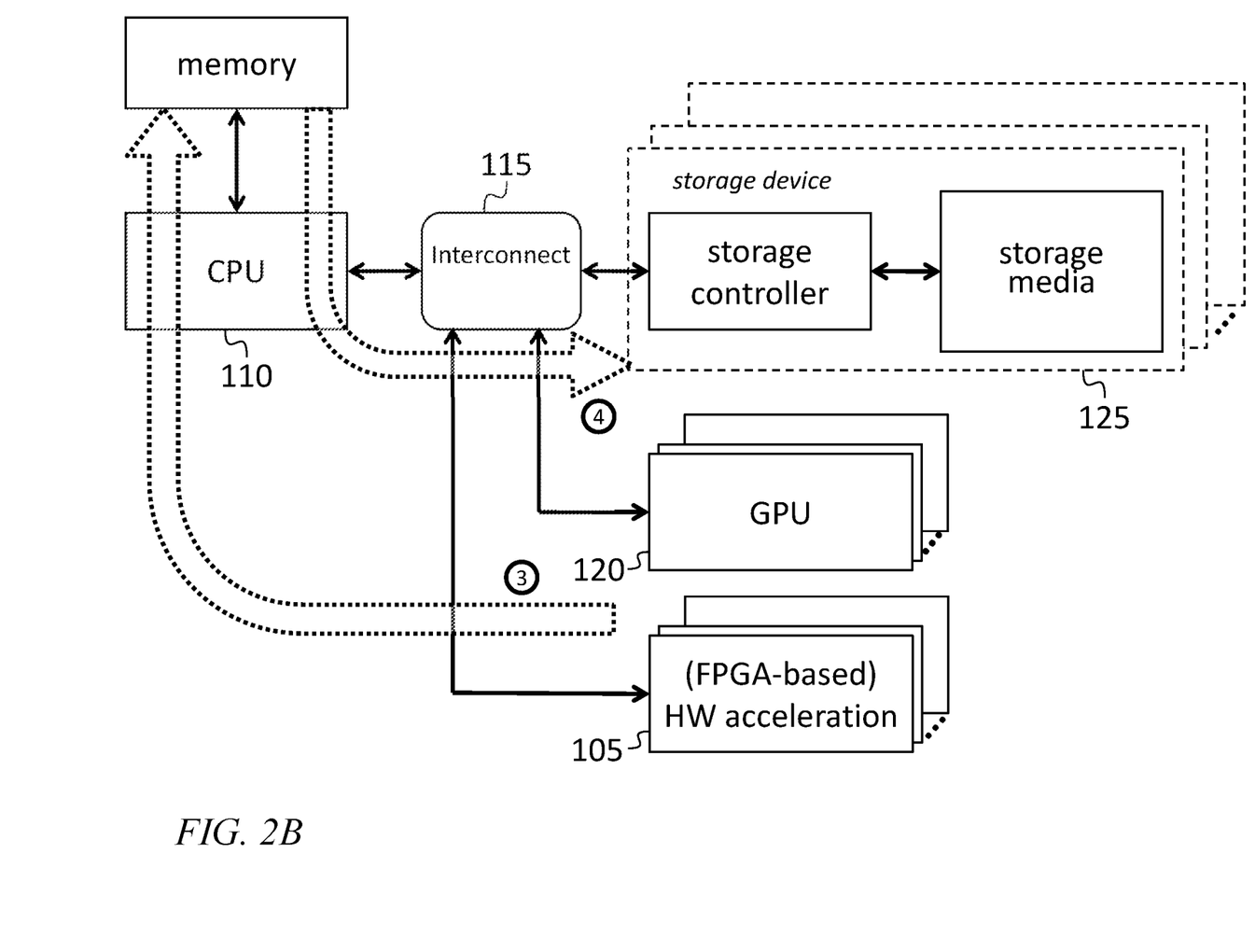
FIG. 2B is a block diagram of a system for storage and processing of data, according to an embodiment of the present disclosure.

Referring to FIGS. 2A and 2B, in some modes of operation of the embodiment of FIG. 1, data are moved from a storage device 125 to the host CPU (in a data transfer (1), i.e., labelled with a circled 1 in FIG. 2A), and then from the host CPU to hardware acceleration engine(s), e.g., GPUs and/or FPGA cards (in a data transfer (2)) before processing takes place. For applications that involve processing large data sets, the data movement may need to be performed multiple times, and the number of data transfer operations used may be a function of the size of memory buffers in the hardware acceleration engines. Once computations are completed in the hardware acceleration engines, computation results are written back to host memory (in a data transfer (3) (FIG. 2B)) and optionally to the storage device(s) 125 (in a data transfer (4)).

Figure 3A:
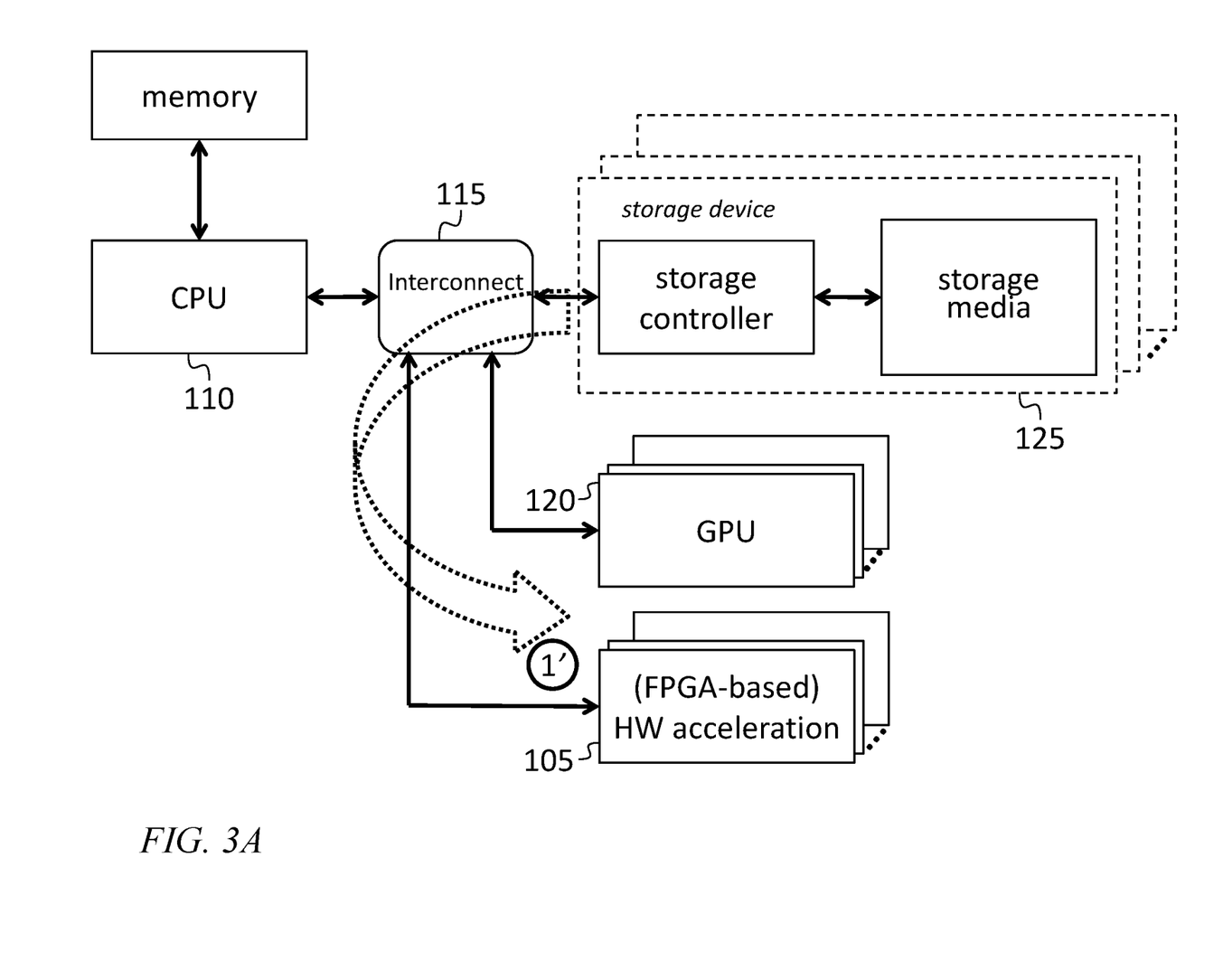
FIG. 3A is a block diagram of a system for storage and processing of data, according to an embodiment of the present disclosure.
Figure 3B:
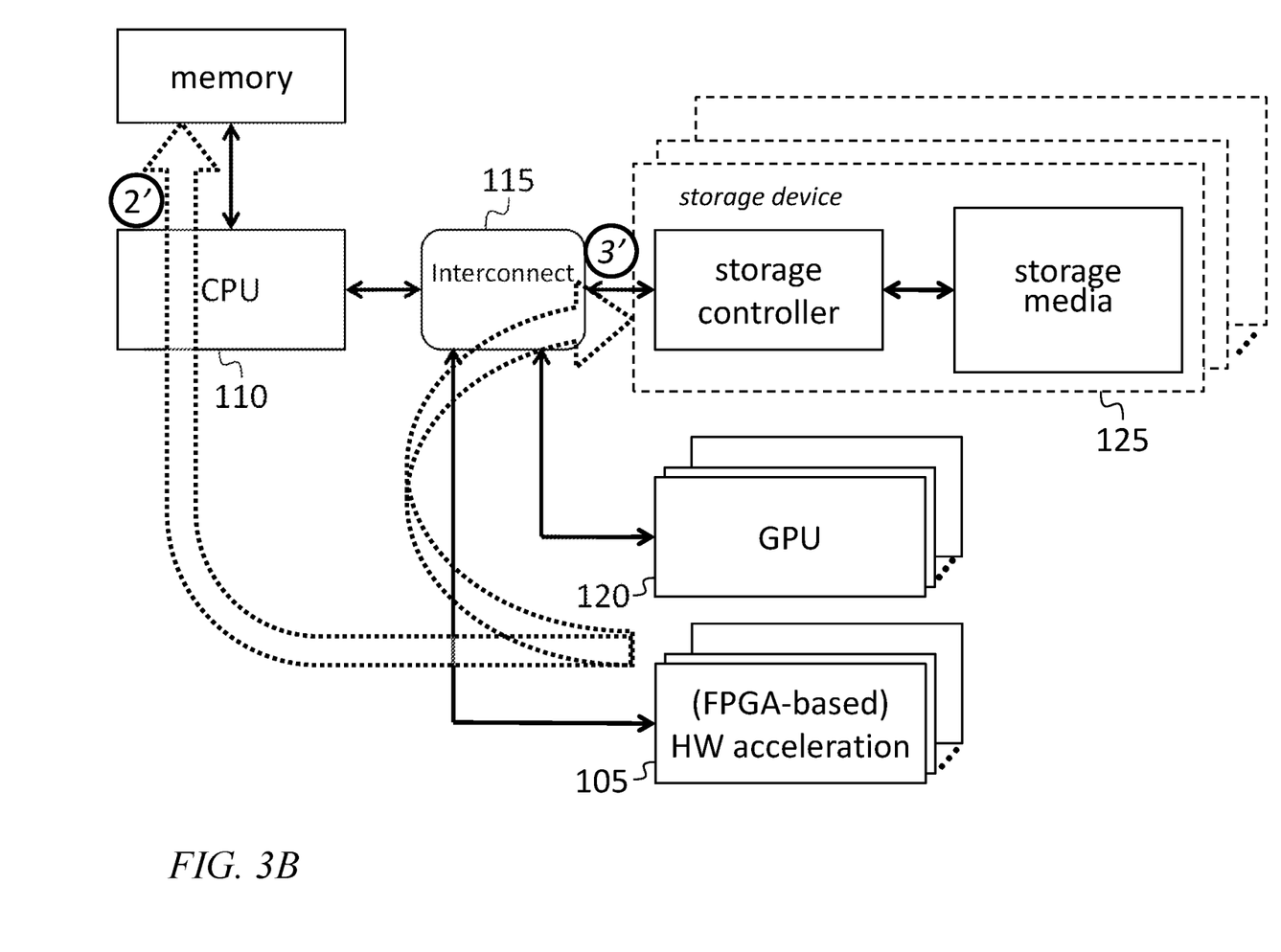
FIG. 3B is a block diagram of a system for storage and processing of data, according to an embodiment of the present disclosure.

The interconnect fabric (or switch) of the embodiment of FIG. 1 may support peer-to-peer connectivity (as is the case for PCIe, for example). Referring to FIGS. 3A and 3B, in some modes of operation for such an embodiment, data may be moved directly from a storage device 125 to a hardware acceleration engine (in a data transfer (1')) before processing takes place. Computation results may then be written back to host memory (in a data transfer (2')) or to storage device(s) 125 (in a data transfer (3')).

Figure 4:
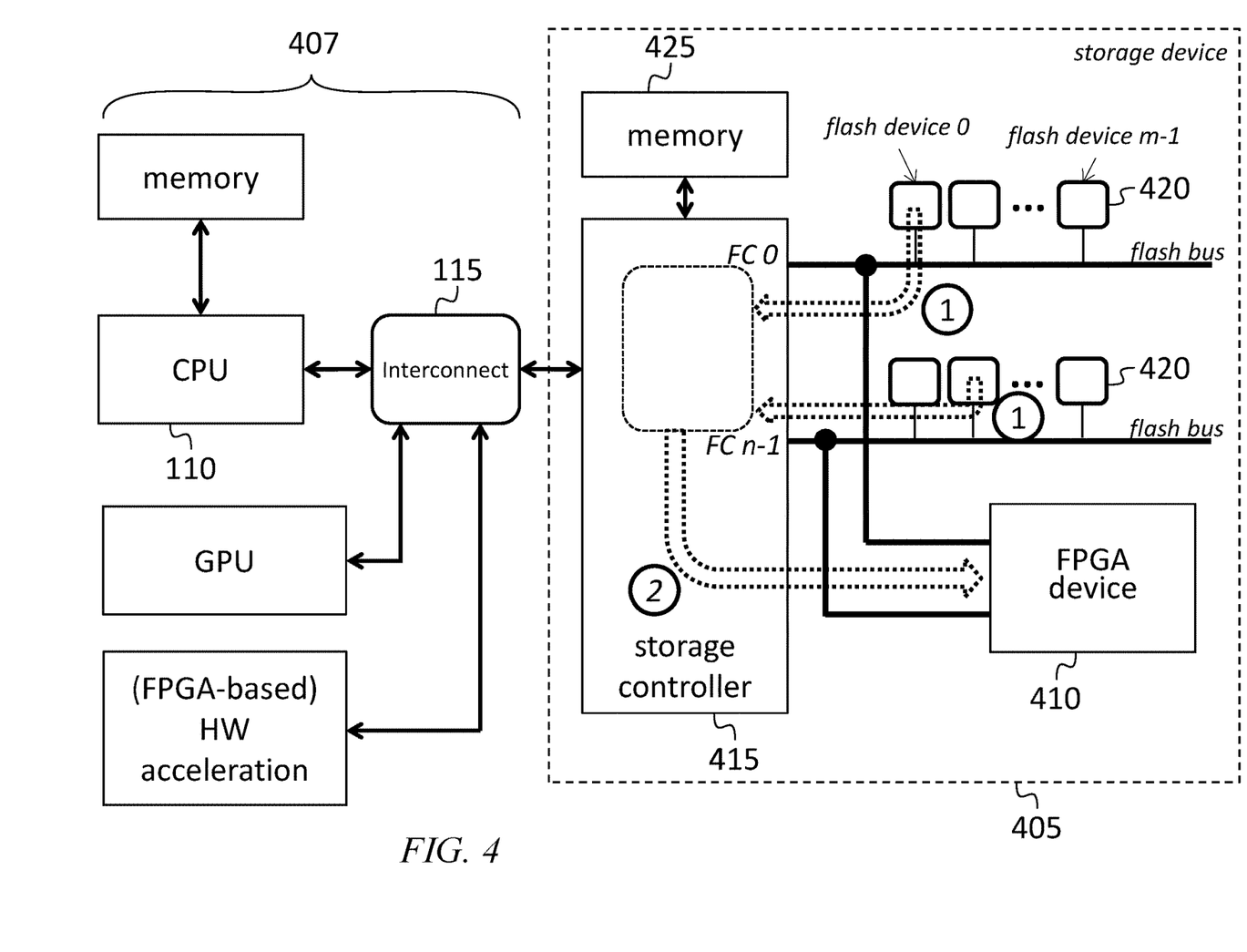
FIG. 4 is a block diagram of a system for storage and processing of data, according to an embodiment of the present disclosure.

Referring to FIG. 4, in some embodiments a storage device 405 (e.g., a solid state drive (SSD)) in the system may include an internal hardware acceleration engine, which may be a processing circuit 410 (discussed in further detail below), e.g., a programmable processing circuit such as an FPGA. In such an embodiment, the internal hardware acceleration engine 410 may perform data processing within the storage device 405. There may therefore be no need for data to be moved out of the storage device 405 before computations are performed. The storage device 405 may be connected to a host 407, as shown; the host may include a CPU 110, an interconnect 115 (e.g., a switch (e.g., a PCIe switch)), a GPU, and a hardware accelerator (e.g., an FPGA-based hardware accelerator). Although some examples described herein, and illustrated in the drawings, are based on an embodiment in which the hardware acceleration engine 410 is an FPGA, the invention is not limited to such embodiments, and in other embodiments the hardware acceleration engine 410 may be any other kind of processing circuit. As used herein, a "field programmable gate array" or "FPGA" is any kind of programmable processing circuit, including, for example, programmable logic devices (PLDs) and complex programmable logic devices (CPLDs).

The use of the programmable logic of an FPGA 410 may provide the flexibility of implementing a wide range of logical and mathematical functions. For example, in some embodiments, any resource available in the FPGA device 410 can be used to implement simple or complex processing functions, such resources including but not being limited to programmable logic (e.g., LUTs), DSP elements, I/O modules and microprocessors. The storage controller 415 of the storage device 405 may be connected to flash media and to the FPGA device 410, and it may enable the movement of data from media to the FPGA 410 device for data processing. The storage controller 415 of the storage device 405 may further enable the movement of data (e.g., data resulting from computations) from the FPGA device 410 to storage (within the storage device 405) or to memory (e.g., to system memory connected to the host CPU) to deliver processing results.

In the embodiment of FIG. 4, the SSD controller (i.e., the storage controller 415) acts like a master; it reads data from storage media (e.g., from nonvolatile memory devices 420, such as flash memory devices) and subsequently writes to the FPGA device 410. An application running in the host CPU 110 may access and control the FPGA device 410 through the SSD controller 415. In this embodiment, the SSD controller 415 has full control of and access to the tables used to map/locate the data within the flash devices (e.g., the logical-to-physical mapping of the flash translation layer (FTL)). Although some examples described herein, and illustrated in the drawings, are based on an embodiment in which the nonvolatile memory devices 420 are flash memory devices, the invention is not limited to such embodiments, and in other embodiments the nonvolatile memory devices 420 may be any other kind of nonvolatile memory devices.

In operation, in some embodiments, an application may be running on the SSD (in-storage computation) or in the host CPU. The application identifies a certain data set as target data to be processed in the hardware acceleration engine (e.g., in the FPGA 410). The application provides the necessary information to identify the location of the data set (e.g. a list of LBAs, a filename or an object identifier) and requests a data transfer.

The SSD controller 415 reads the data set from flash media. The data set may have been stored in a collection of pages, blocks, dies and channels. Accordingly, the SSD controller 415 will perform one or more read operations to access the data set in its entirety. The data read from the storage media may or may not be temporarily stored in a memory element 425 accessible by the SSD controller 415.

The SSD controller 415 then writes the data set to the FPGA device 410. As the data set is being read from the storage media, the SSD controller 415 may immediately start writing the data to the FPGA device 410. The SSD controller 415 may use the same physical interface used to access the storage media to transfer data to and from FPGA device 410, as discussed in further detail below, and in U.S. Pat. No. 10,223,316, which is incorporated herein by reference. Any suitable protocol may be used, including but not limited to ONFI and Toggle protocols used to access the nonvolatile memory devices (e.g., flash memory devices). Read operations (from flash media) and write operations (to FPGA 410) may be interleaved or, alternatively, be performed sequentially.

The FPGA device 410 may be programmed (by the SSD controller 415, or by the host 407) in order to perform the following tasks: (i) support the same physical interface used by the SSD controller 415 to access the media, (ii) support the same protocol used by the SSD controller 415 to access the media, (iii) support write commands originating from the SSD controller 415, (iv) support read commands originating from the SSD controller 415, (v) provide a buffer that will hold the data set partially or in its entirety, and (vi) implement the processing function that the application is off-loading to the programmable logic in the FPGA device 410. The SSD controller 415 may program the FPGA device 410 by loading into it a suitable configuration file (e.g., a "bit file"); the host 407 may program the FPGA device 410 by instructing the SSD controller 415 to load a bit file (e.g., a bit file sent to the SSD controller 415 by the host 407, or a bit file already stored in the storage device 405, and identified by the host 407) into the FPGA device 410.

The processing function implemented in the FPGA device 410 may (i) be self-contained, i.e., it may not require any additional parameters or commands from the application, or it may (ii) be dependent on parameters determined and passed by the application. In the latter case, the application may use the same write mechanism (as the mechanism used to write data to the FPGA device 410) to push commands or parameters to the FPGA device 410 that can then be consumed by the logic implementing the processing function. Commands and parameters may be pushed to a pre-determined address range (mapped to the FPGA device 410) or may be identified and decoded on-the-fly using mechanisms such as metadata or side band signaling between the SSD controller 415 and the FPGA device 410.

Figure 5:
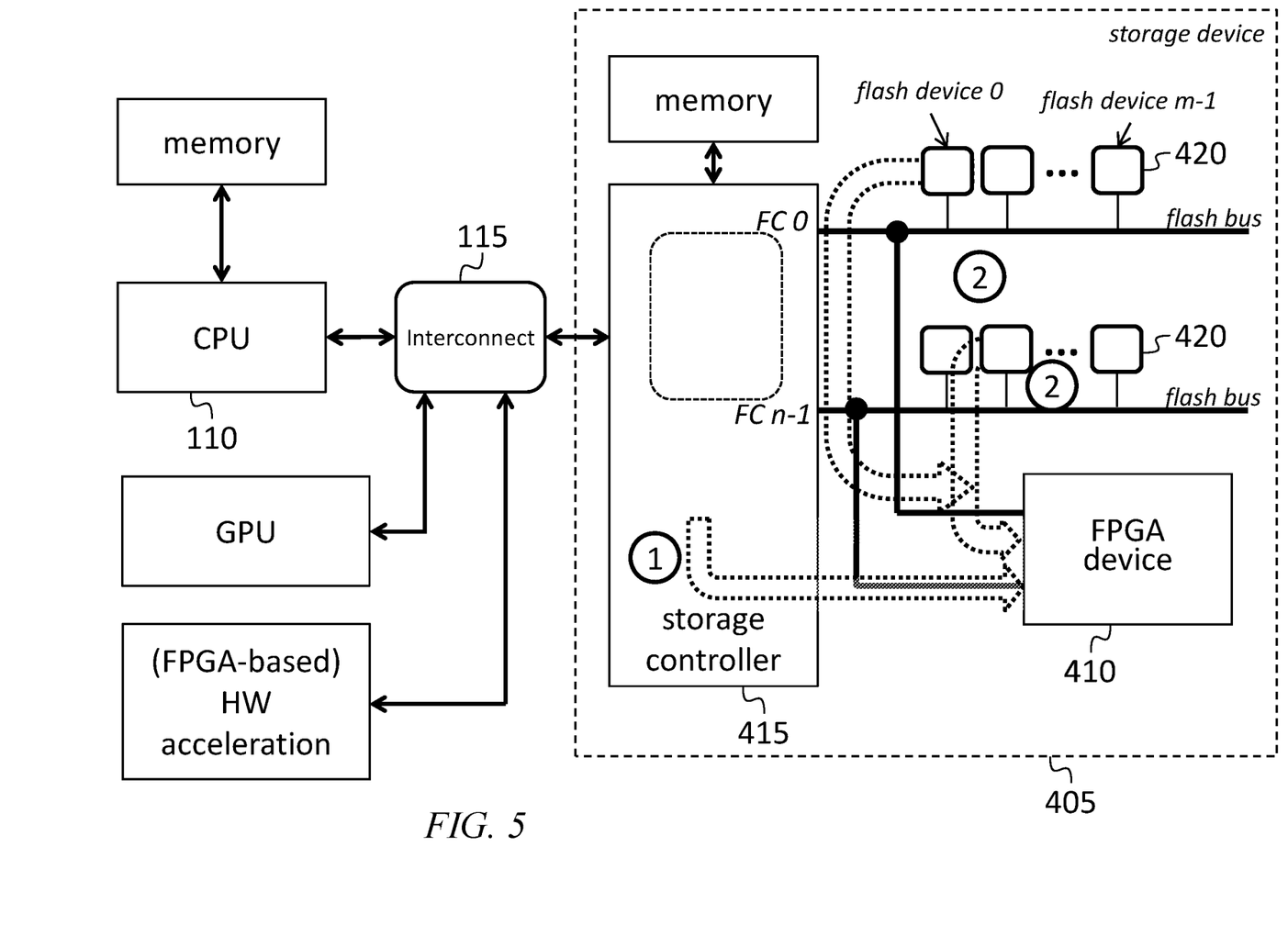
FIG. 5 is a block diagram of a system for storage and processing of data, according to an embodiment of the present disclosure.

Referring to FIG. 5, in another embodiment, the FPGA device 410 acts like a master and reads directly from the storage media. In the embodiment of FIG. 5, the logic implemented in the FPGA device 410 has access to these tables (e.g., tables of the flash translation layer) which may otherwise be controlled by the SSD controller 415 and stored in the media itself.

In operation, as in the case of the embodiment of FIG. 4, an application may be running on the SSD (in-storage computation) or in the host CPU 110. The application identifies a certain data set as target data to be processed in the hardware acceleration engine (e.g., in the FPGA device 410). The application provides the necessary information to identify the location of the data set (e.g. a list of LBAs, a filename or an object identifier) and requests a data transfer.

In the case of the embodiment of FIG. 5, however, the SSD controller 415, instead of reading the data set, pushes, to the FGPA device (e.g., the SSD controller 415 writes, to memory (e.g., to a buffer or to registers) in the FPGA device 410), all the information about the physical location in the media array for all the pieces of data that compose the data set. The function implemented in the FPGA device 410 then reads directly from the flash devices 420 using the information provided by the SSD controller 415. In some embodiments the FPGA device 410 processes data read (e.g., directly) from the nonvolatile memory devices 420 (e.g., flash devices), and writes the results of the processing directly to the flash devices 420. As used herein, reading data "directly" by the FPGA device 410 from the flash devices 420 (or writing data "directly" by the FPGA device 410 to the flash devices 420) means reading (or writing) the data by the FPGA device 410 without the data passing through the SSD controller 415.

As in the case of the embodiment of FIG. 4, the data set may have been stored in a collection of pages, blocks, dies and channels. Accordingly, the logic in the FPGA device 410 will perform one or more read operations to access the data set in its entirety. The logic in the FPGA device 410 uses the appropriate physical interface and protocol to access flash media to transfer data to and from the FPGA device 410. Any suitable protocol may be used, including but not limited to ONFI and Toggle protocols used to access the nonvolatile memory devices (e.g., flash memory devices). A synchronization mechanism may be used to avoid contention (for control of any flash channel (FC) interface to which the FPGA device 410 is connected) due to concurrent accesses to the media originated from the SSD controller 415 and the FPGA device 410. For example, because the FPGA device 410 executes operations commanded by the SSD controller 415, and the controller also initiates accesses to the flash devices during standard NAND operations, the synchronization, or "arbitration", may be fully orchestrated by the controller. In some embodiments no synchronization mechanism is needed. As discussed in further detail below, and in U.S. Pat. No. 10,223,316, which is incorporated herein by reference, the FPGA device 410 in the embodiment of FIG. 5 may at times act as a flash channel controller, and at times as a flash device.

The FPGA may be programmed to perform the same six tasks as those identified above, in the context of the embodiment of FIG. 4. As in the case of the embodiment of FIG. 4, the processing function implemented in the FPGA device 410 may be self-contained, or it may be dependent on parameters determined and passed by the application.

Figure 6:
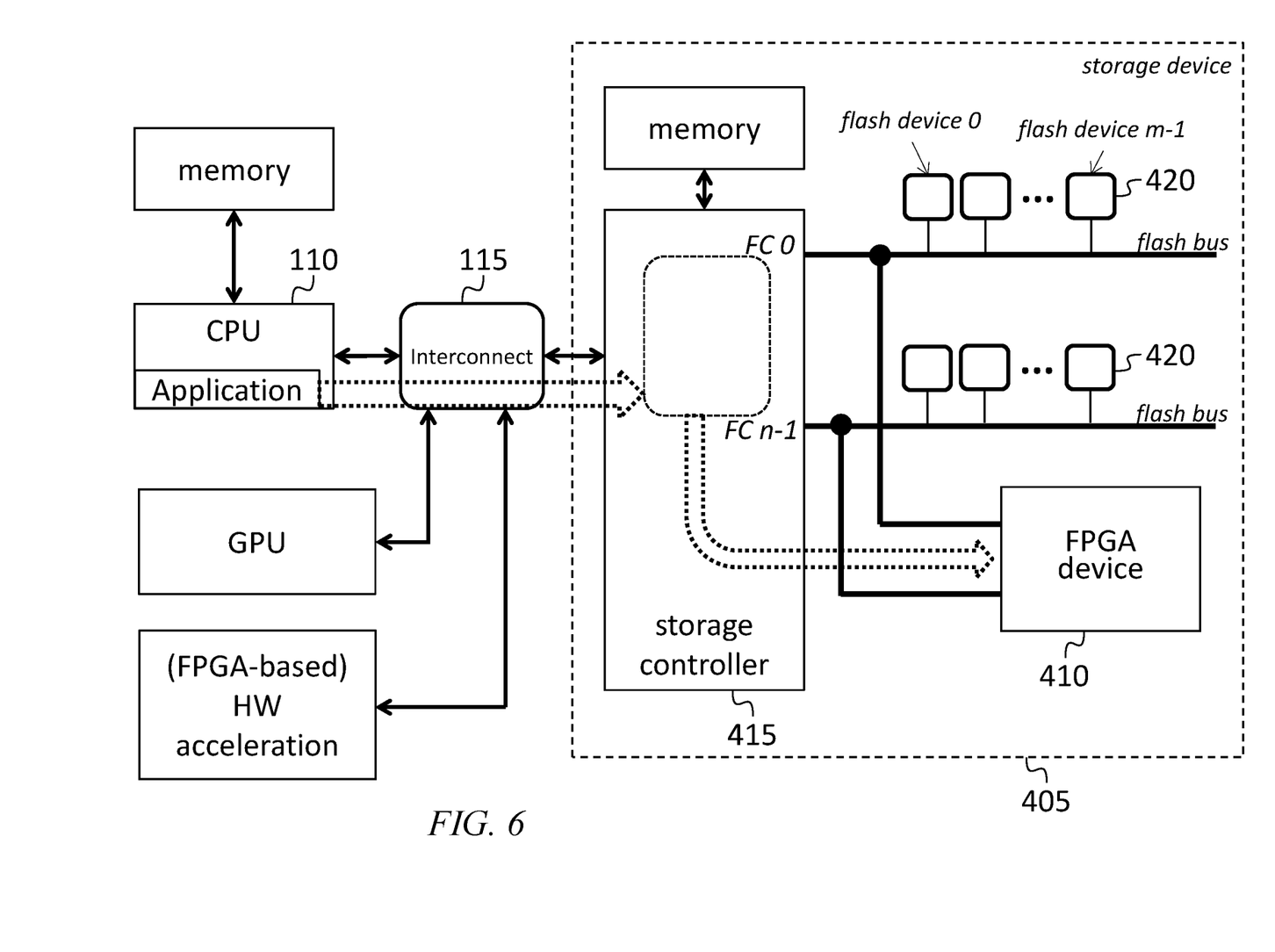
FIG. 6 is a block diagram of a system for storage and processing of data, according to an embodiment of the present disclosure.

Referring to FIG. 6, in another embodiment, an application (or "host application") may be running on the host CPU, which may act like the master. In operation, the application identifies a certain data set as target data to be processed in the hardware acceleration engine (e.g., in the FPGA device 410). The application prepares the data set, which may have been stored in a collection of pages, blocks, dies and channels in the flash media or may have been generated by the application in real time. The application pushes the data set to the FPGA device 410 with the appropriate parameters so that the data set can be processed. The SSD controller 415 is used to push to the FPGA device 410 all the information (i.e. data, commands or parameters) that is required to perform the processing.

In the embodiments of FIGS. 4-6, the application may perform read and write operations to a specific address range (which is mapped to the FPGA device 410) in order to access the FPGA device 410 and push commands, parameters, or data. Specifically, the FPGA device 410 may be physically connected to the flash channels, and a portion of the memory map on the flash interface may be reserved for (i.e., mapped to) the FPGA device 410. The logic implemented on the FPGA device 410 decodes commands sent through the SSD controller 415 according to the memory map.

In the embodiment of FIG. 6, the FPGA may be programmed to perform the same six tasks as those identified in the context of the embodiment of FIG. 4. As in the case of the embodiment of FIG. 4, the processing function implemented in the FPGA device 410 may be self-contained, or it may be dependent on parameters determined and passed by the application.

Figure 7:
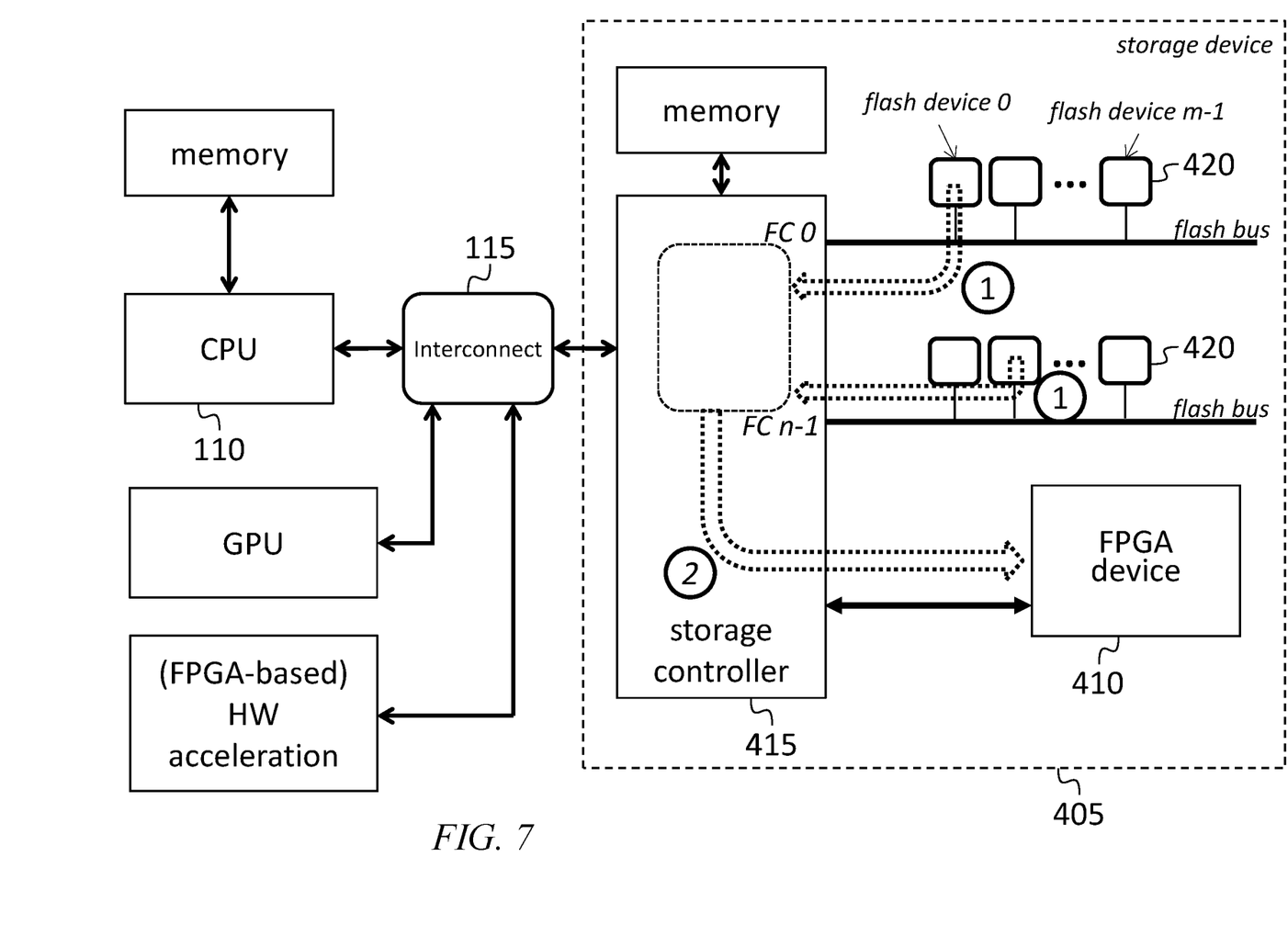
FIG. 7 is a block diagram of a system for storage and processing of data, according to an embodiment of the present disclosure.

Variants of the embodiments of FIGS. 4-6 include (i) a variant in which a non-volatile media other than NAND flash is used (e.g. MRAM), (ii) a variant in which volatile media is used instead of non-volatile media, e.g. DRAM or SRAM (iii) a variant in which interfaces and protocols other than those used for NAND flash are used to connect to the media, such as (1) serial or parallel interfaces, (2) SDR or DDR interfaces, or (3) single or multi-channel interfaces. FIG. 7 shows a variant in which the FPGA device 410 is connected to the SSD controller 415 but with an interface different than the one used to connect to media.

In some embodiments, the FPGA device 410 may present a flash channel interface, and, accordingly, the writing and reading of data, commands, and parameters by the SSD controller 415 to and from the FPGA device 410 may proceed in the same manner as the reading and writing of data, by the SSD controller 415, to and from flash memory devices. Examples of how such reading and writing may be performed are described in U.S. Pat. No. 10,223,316, which is incorporated herein by reference. The FPGA device 410 may, for example, be connected to one of the 32 decoded chip enable signals of the embodiment of FIG. 4 of U.S. Pat. No. 10,223,316 (in place of one of the flash memory die of one of the die groups 440 of FIG. 4 of U.S. Pat. No. 10,223,316). It will be understood that in some embodiments similar to that of FIG. 4 of U.S. Pat. No. 10,223,316, more than 32 or fewer than 32 decoded chip enable signals may be used. In the embodiment of FIGS. 4 and 6 (of the present application), the FPGA device 410 may ignore signals on the flash channel interface (element 405 of FIG. 4 of U.S. Pat. No. 10,223,316) except when the decoded chip enable signal to which the FPGA device 410 is connected is asserted. Because, in such an embodiment, the interface to the FPGA device 410 is one already implemented on the SSD controller 415, extensive changes to the SSD controller 415 may not be needed to modify a storage device constructed according to U.S. Pat. No. 10,223,316 to include an FPGA device 410 configured to operate as a hardware acceleration engine as described herein.

In some embodiments, the FPGA device 410 may be connected to several flash channel interfaces (as shown, for example, in FIGS. 4-6), increasing the total bandwidth between the SSD controller 415 and the FPGA device 410, and/or the total bandwidth between the storage media and the FPGA device 410. In the embodiment of FIG. 5 (of the present application), the FPGA may be connected to all of the buses (or "channels") of the flash channel interface and, (i) when acting as the flash channel controller, it may assert a suitable subset of the chip enable signals to read from, or write to, one of the flash memory die connected to the flash channel interface and (ii) when acting as a flash channel storage device, it may ignore signals on the flash channel interface except when the chip enable signals have a value corresponding to the range of memory to which the FPGA device 410 is mapped.

As used herein, a nonvolatile memory device is a quantity of flash memory (e.g., a flash memory die, or a plurality of flash memory dies) having an external interface. For example, a flash memory package that contains a flash memory die or a plurality of flash memory dies, and that is suitable for installation on printed circuit board, is an example of a nonvolatile memory device.

In some embodiments, the storage device 405 is connected to the host 407 through an interface, referred to herein as a "storage interface" which is of a kind suitable for making a connection between a host and a persistent storage device. The storage interface may be, for example, Peripheral Component Interconnect Express (PCIe), Non Volatile Memory Express (NVMe), Non Volatile Memory (NVM) over Fabric, Serial Advanced Technology Attachment (SATA), Fibre Channel, Small Computer System Interface (SCSI), Serial Attached SCSI (SAS), SCSI over PCIe, Ethernet, or Universal Serial Bus (USB).

In some embodiments, the storage device 405 may conform to a 3.5 inch hard drive form-factor (or "large form factor" (LFF)) standard, or to a 2.5 inch hard drive form-factor (or small form factor (SFF)) standard, or to an M.2 module form factor standard, or to an EDSFF 1U Short (E1.S) form factor standard, or to an EDSFF 1U Long (E1.L) form factor standard, or to an EDSFF 3" (E3) form factor standard. In other embodiments the solid state drive 110 may conform to a standard PCIe card form factor, e.g., a full-height, full length (FH-FL) card outline, or a full-height, half length (FH-HL) outline.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the word "or" is inclusive, so that, for example, "A or B" means any one of (i) A, (ii) B, and (iii) A and B.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB. As used herein, a "programmable processing circuit" is a processing circuit (such as an FPGA) including one or more programmable interconnects.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for heterogeneous in-storage computation have been specifically described and illustrated herein, many modifications and variations will be apparent to those skilled in the art. Accordingly, it is to be understood that a system and method for heterogeneous in-storage computation constructed according to principles of this disclosure may be embodied other than as specifically described herein. The invention is also defined in the following claims, and equivalents thereof.

What is claimed is:

1. A storage device connectable to a host having a CPU and an interconnect by way of which the storage device is connectable to the host, the storage device comprising:
a storage controller;
a nonvolatile memory device operable to store a data set;
a first physical interface providing a direct connection between the storage controller and the nonvolatile memory device; and
a processing circuit separate from the storage controller and from the nonvolatile memory device, the processing circuit operable to process said data set;
a second physical interface providing a direct connection between the processing circuit and the storage controller, or between the processing circuit and the nonvolatile memory device,
the second physical interface being the same as the first physical interface, and
there being a data path, utilizing the first physical interface, connecting the storage controller and the nonvolatile memory device without passing through the processing circuit for delivery of the first data set between the controller and the nonvolatile memory device,
wherein the processing circuit comprises an internal hardware acceleration engine separate and distinct from the storage controller.

2. The storage device of claim 1, wherein the nonvolatile memory device is configured to communicate utilizing a first protocol, and
the processing circuit is configured to communicate with the storage controller utilizing the first protocol.

3. The storage device of claim 2, wherein the first protocol is Toggle or Open NAND Flash Interface (ONFI).

4. The storage device of claim 1, wherein the processing circuit is configured to support write commands sent to the processing circuit by the storage controller.

5. The storage device of claim 1, wherein the processing circuit is configured to support read commands sent to the processing circuit by the storage controller.

6. The storage device of claim 1, wherein the processing circuit comprises a buffer for temporary data storage.

7. The storage device of claim 1, wherein:
the processing circuit is a programmable processing circuit, and
the storage controller is configured to program the processing circuit.

8. The storage device of claim 1, wherein:
the storage controller is configured to write parameters to memory in the processing circuit; and
the processing circuit is configured to process data based on the parameters.

9. The storage device of claim 1, wherein the storage controller is configured to:

read data from the nonvolatile memory device,
write the data to the processing circuit.

10. The storage device of claim 1, wherein the processing circuit is configured to read data directly from the nonvolatile memory device.

11. The storage device of claim 10, wherein the storage controller is configured to write, to the processing circuit, an address, in the nonvolatile memory drive, of data to be processed.

12. The storage device of claim 10, wherein the processing circuit is further configured to:
process the data, and
write a result of the processing of the data directly to the nonvolatile memory device.

13. A system, comprising:
a host, comprising a host central processing unit (CPU), and
a storage device according to claim 1, wherein
the host is configured to:
write, to the processing circuit, an address, in the nonvolatile memory device, of data to be processed.

14. The system of claim 13, wherein:
the host is configured to write parameters to memory in the processing circuit; and
the processing circuit is configured to process data based on the parameters.

15. The system of claim 13, wherein the processing circuit is configured to read the data to be processed directly from the nonvolatile memory device.

16. The system of claim 13, wherein the processing circuit is further configured to:
process the data, and
write a result of the processing of the data directly to the nonvolatile memory device.

17. The storage device of claim 1, wherein the processing circuit comprises a hardware acceleration engine.

* * * * *